April 3, 1928.                W. E. SPANGLE                1,664,796
WOODEN PIPE TAP
Filed Feb. 7, 1927
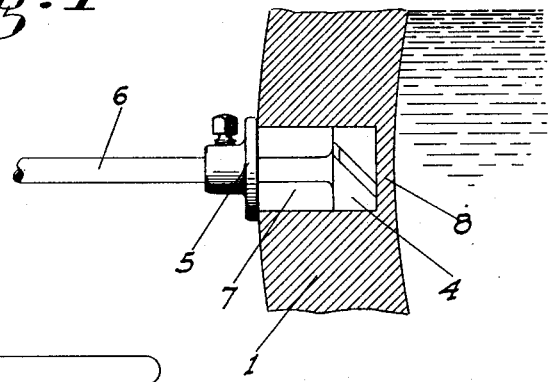
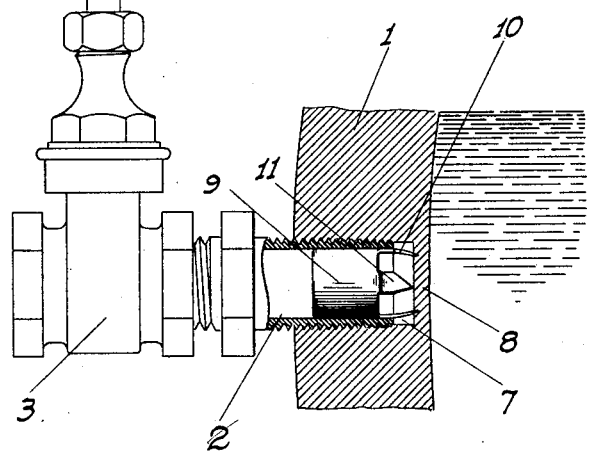
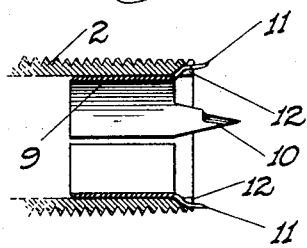 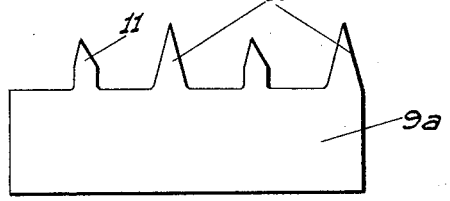
INVENTOR
W. E. Spangle
BY
ATTORNEY Patented Apr. 3, 1928.

1,664,796

UNITED STATES PATENT OFFICE.

WILLIAM E. SPANGLE, OF FAIROAKS, CALIFORNIA.

WOODEN-PIPE TAP.

Application filed February 7, 1927. Serial No. 166,527.

This invention relates to the tapping of wood pipe in order to connect a lateral or branch pipe or fitting of the ordinary metal character thereto.

Wood pipes of large diameter are used in various sections of the country to carry water for irrigating or other purposes from a source of supply to a point of consumption. The pipes frequently pass by farms and the like which have no water pressure systems of their own, and the tapping of the wood pipe (in which the water is frequently under considerable and constant pressure) would therefore provide the farm dwellers with the desired supply of water under pressure for domestic and similar uses. If the pipe is tapped through while the water is running, a stream would immediately issue therefrom which would make it a very awkward and inconvenient, if not impossible, job to then screw the pipe into the drilled hole.

It is impractical however to shut off the water in the pipe, since the control valve is liable to be located at a remote point and this action would of course inconvenience all other users of the water.

The principal object of my invention therefore is to provide a method for enabling a pipe of this character to be tapped, and a metal pipe connection made therewith without danger of the water flowing from the tapped hole until the metal pipe has been securely screwed into the wood pipe.

I have also provided suitable instrumentalities for enabling this method to be readily and easily carried out with a minimum of time, effort and expense.

These objects I accomplish by means of such structure and relative arrangement of parts as will fully appear by a perusal of the following specification and claims.

In the drawings similar characters of reference indicate corresponding parts in the several views:

Fig. 1 is a fragmentary section of a wood pipe showing the initial drilling operation into said pipe completed.

Fig. 2 is a similar view showing a metal pipe fitting and valve as being screwed into the tapped hole in the wood pipe.

Fig. 3 is a fragmentary sectional elevation of a pipe fitting showing the plug removing and reaming implement mounted in place therein.

Fig. 4 is a plan view of the blank from which the implement is formed.

Referring now more particularly to the characters of reference on the drawings, the numeral 1 denotes a wood pipe of ordinary character, the thickness of which averages one inch or over, this being the pipe which is to be tapped. The initial operation is to drill a blind hole into the pipe of a diameter such as will make a snug fit with the base of the threads of a standard pipe threaded coupling 2, to the outer end of which a valve 3 preferably of the gate type is first secured. This operation is performed by means of a drill bit 4 of that character which is without a projecting centering screw or pin. An adjustable stop collar 5, which is larger than the diameter of the bit, is fixed on the shank 6 of the same. This collar is positioned so that the bit cannot penetrate entirely through the thickness of the pipe, such thickness being presumed to be known. When the drill has penetrated to the depth permitted by the stop collar it is removed, leaving a blind hole 7 with a solid plug 8 still remaining between the bottom of the hole and the interior of the pipe. The hole is then ready to receive the fitting 2, which upon being turned into the hole will of course cut its own threads into the wood, owing to the relative diameters of the hole and threads of the fitting.

Before thus inserting the fitting, however, I mount a special form of cutting tool therein, this tool comprising a split band 9 which is inserted in the bore of the fitting at its inner end so that it will frictionally engage said bore. This band is provided with two opposed sets of cutting prongs 10 and 11 which extend longitudinally of the fitting and band beyond the inner end of said fitting. The prongs 10 are substantially in line with the band and hence with the bore of the fitting. The prongs 11 are shorter than the prongs 10 and are bent outwardly to snugly engage the wall of the hole 7 itself. These outwardly bent prongs fit in longitudinal notches or slots 12 cut in the sides of the fitting 2 from its inner end, so as to prevent the turning of the band in the fitting and also prevent longitudinal movement of the band inwardly of said fitting beyond a certain point.

Upon screwing the fitting into the hole with the cutting implement in place therein, the prongs 10 will engage the plug 8 and cut through the same, the length of these prongs being such that their initial engagement with the plug will not take place until the fitting 2 has been screwed into the hole a sufficient distance to make a water-tight fit.

As the cutters 10 engage and cut through the plug, so that the hole is opened to the interior of the pipe, the outer prongs 11 ream the portion of the hole from which the plug has been removed, so that the advancing fitting can be screwed into the reamed portion. If the plug as cut away is pressed inwardly of the pipe it will be carried away by the flow of the water. If it remains engaged by the cutting prongs, or the water forces the plug through the fitting toward the valve, the opening of the latter (which up to this time has been kept closed) will cause the plug to be swept through and clear of the valve, and lengths of pipe, hose or the like may then be coupled to said valve.

The cutting implement remains permanently in the fitting, but inasmuch as it is made out of a cheap blank 9ª as shown in Fig. 4 and is simply bent to shape, the expense of manufacture is negligible and its loss, after having once served its purpose, is also negligible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for removing the wood remaining at the bottom of a hole partially drilled through the side of a wooden pipe to receive a threaded pipe fitting, comprising a cutting element projecting longitudinally from the inner end of the fitting and adapted to engage and cut the wood circumferentially with the rotative advancement of the fitting into the hole, and a band on which the element is mounted adapted to be fitted into the bore of the fitting at its inner end.

2. A device for removing the wood remaining at the bottom of a hole partially drilled through the side of a wooden pipe to receive a threaded pipe fitting, comprising a cutting element projecting longitudinally from the inner end of the fitting and adapted to engage and cut the wood to form an extension of the hole concentric with but smaller than the original hole with the rotative advancement of the fitting into the hole, and an additional cutter to engage the wood after the first cutter has engaged the same to ream such extension hole to the same size as the original hole.

3. A structure as in claim 2, with a common means for mounting both cutters in place in the fitting.

4. A device for removing the wood remaining at the bottom of a hole partially drilled through the side of a wooden pipe to receive a threaded pipe fitting, comprising a cutting element projecting longitudinally from the inner end of the fitting, a band on which said cutter is mounted adapted to be inserted into the inner end of the fitting, and a second longitudinally extending cutter secured to the band and bent outwardly therefrom to lie farther from the center of the fitting than the first cutter; said fitting having a longitudinal slot cut in from its outer end to receive the second cutter, the bend of said cutter seating in the bottom of the slot.

In testimony whereof I affix my signature.

WILLIAM E. SPANGLE